(12) United States Patent
Kim et al.

(10) Patent No.: US 12,087,119 B2
(45) Date of Patent: Sep. 10, 2024

(54) DEVICE AND METHOD FOR CONTROLLING DOOR LOCK

(71) Applicant: HANWHA TECHWIN CO., LTD., Seongnam-si (KR)

(72) Inventors: Jongho Kim, Seongnam-si (KR); Myung-Hwa Son, Seongnam-si (KR); Minsuk Sung, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 244 days.

(21) Appl. No.: 17/791,896

(22) PCT Filed: Jul. 21, 2020

(86) PCT No.: PCT/KR2020/009575
§ 371 (c)(1),
(2) Date: Jul. 9, 2022

(87) PCT Pub. No.: WO2021/157794
PCT Pub. Date: Aug. 12, 2021

(65) Prior Publication Data
US 2023/0042025 A1 Feb. 9, 2023

(30) Foreign Application Priority Data

Feb. 5, 2020 (KR) .......... 10-2020-0013447
Jun. 10, 2020 (KR) .......... 10-2020-0070093

(51) Int. Cl.
*G06V 20/52* (2022.01)
*E05B 47/00* (2006.01)
(Continued)

(52) U.S. Cl.
CPC .......... *G07C 9/37* (2020.01); *G06V 40/172* (2022.01); *G06V 40/174* (2022.01); *G06V 40/20* (2022.01);
(Continued)

(58) Field of Classification Search
CPC .......... Y02E 10/50; Y02E 70/30; H04W 4/80; H04N 7/186; H04N 7/188; H04L 12/282;
(Continued)

(56) References Cited

U.S. PATENT DOCUMENTS 11,798,340 B1 * 10/2023 Xu .......... G07C 9/30
2013/0015946 A1 1/2013 Lau et al.
(Continued)

FOREIGN PATENT DOCUMENTS

KR 10-1011272 B1 1/2011
KR 10-2017-0123950 A 11/2017
KR 10-1975257 B1 9/2019

OTHER PUBLICATIONS

International Search Report for International Application No. PCT/KR2020/009575 issued on Nov. 4, 2020.
(Continued)

*Primary Examiner* — Dionne Pendleton
(74) *Attorney, Agent, or Firm* — McLean IP Global; Jason Y. Pahng

(57) ABSTRACT

A door lock control device comprises: a door lock interface for communicating with a door lock; an imaging device; a controller for processing images to be acquired through the imaging device; and a storage medium. The controller determines each of first and second objects in the images as being either authorized or unauthorized depending on whether each of the first and second objects matches authentication data read from the storage medium, and controls the door lock through a door lock interface by referring to a distance between the first and second objects determined from the images when the first object is determined as being authorized and the second object is determined as being unauthorized.

15 Claims, 10 Drawing Sheets

(51) Int. Cl.
*G06V 40/16* (2022.01)
*G06V 40/20* (2022.01)
*G07C 9/00* (2020.01)
*G07C 9/37* (2020.01)
*G08B 25/00* (2006.01)

(52) U.S. Cl.
CPC ....... *G07C 9/00563* (2013.01); *G08B 25/002* (2013.01)

(58) Field of Classification Search
CPC ............. H04L 12/2827; H04L 12/2829; H04L 2463/082; H04L 63/0861; H04L 63/107; H02S 10/10; H02S 10/20; H02K 11/0094; H02K 7/116; H02K 7/1853; G10L 17/00; G10L 17/08; G10L 17/22; G10L 17/24; G08B 21/18; G08B 21/24; G08B 25/002; G08B 3/10; G07B 15/02; G06T 2207/10016; G06T 2207/30196; G06T 2207/30232; G06T 7/20; G06T 7/579; E05Y 2400/356; E05Y 2400/66; E05Y 2400/80; E05Y 2800/426; E05Y 2900/132; E05Y 2900/148; E05B 17/226; E05B 2047/0058; E05B 2047/0062; E05B 2047/0064; E05B 2047/0065; E05B 2047/0097; E05B 47/0012; E05B 47/026; E05B 47/0603; E05B 47/0673; E05B 49/00; E05B 65/0075; G06F 21/32; G06F 16/176; G06F 21/44; G06F 21/554; G06F 21/6245; G06F 21/71; G06F 21/82; G06F 21/84; G06F 2221/032; G06F 3/013; G06F 3/0346; G06F 40/109; E05F 15/71; E05F 15/73; E05F 15/77; G07C 9/00563; G07C 2209/63; G07C 9/00309; G07C 9/37; G07C 2009/00357; G07C 2009/00412; G07C 2009/00484; G07C 2009/00634; G07C 2009/00642; G07C 2009/0065; G07C 2209/02; G07C 2209/14; G07C 2209/62; G07C 9/00; G07C 9/00174; G07C 9/00571; G07C 9/0069; G07C 9/10; G07C 9/15; G07C 9/215; G07C 9/253; G07C 9/257; G07C 9/28; G07C 9/29; G07C 9/30; G06V 20/52; G06V 40/10; G06V 40/172; G06V 40/20; G06V 20/41; G06V 10/143; G06V 10/25; G06V 10/34; G06V 20/44; G06V 40/161; G06V 40/165; G06V 40/166; G06V 40/171; G06V 40/174; G06V 40/18
See application file for complete search history.

(56) References Cited

U.S. PATENT DOCUMENTS

| | | | | |
|---|---|---|---|---|
| 2014/0015978 | A1* | 1/2014 | Smith | G07B 15/02 348/156 |
| 2018/0211461 | A1 | 7/2018 | Xin | |
| 2019/0073846 | A1* | 3/2019 | Kamkar | G07C 9/28 |
| 2020/0141157 | A1* | 5/2020 | Miller | H02K 11/0094 |
| 2020/0293754 | A1* | 9/2020 | Huang | G06F 3/013 |
| 2021/0010315 | A1* | 1/2021 | Honjo | G07C 9/37 |
| 2021/0232673 | A1* | 7/2021 | Athlur | G06F 21/82 |
| 2024/0013401 | A1* | 1/2024 | Mahajan | G06V 20/44 |

OTHER PUBLICATIONS

International Preliminary Report on Patentability for International Application No. PCT/KR2020/009575 issued on Nov. 4, 2020.

* cited by examiner

DEVICE AND METHOD FOR CONTROLLING DOOR LOCK

This application is a national stage application, filed under 35 U.S.C § 371, of international patent application number PCT/KR2020/009575, filed on Jul. 21, 2020, which is hereby incorporated by reference in its entirety. In addition, this application claims priority from Korean application number 10-2020-0013447, filed on Feb. 5, 2020, and Korean application number 10-2929-0070093, filed on Jun. 10, 2020, which are hereby incorporated by reference in their entirety.

BACKGROUND OF THE DISCLOSURE

Field of the Disclosure

An embodiment of the present disclosure relates to an electronic device, and more particularly, to a device and method for controlling a door lock.

Related Art

A digital door lock is generally installed on a door connecting the inside and outside of a building and/or a household, and is required to have higher security and reliability than other electronic products. In the case of most door locks, a user interface such as a keypad is exposed to the outside, and a user can unlock the door lock by inputting a password to such a keypad.

Recently, crimes of the type of breaking into a building and/or a household by following a victim through a door have occurred. These crimes are recognized as an important social problem considering the recent trend in which the proportion of single-person households is increasing. For example, an assailant may stand near a victim, approach the victim while the victim unlocks a door lock by inputting a password to a keypad and pass through the door with the victim. The victim may try to input the password quickly when he/she recognizes that the perpetrator is located at a close distance, but it may take longer than usual to input the password for reasons such as fear or panic, which may allow the perpetrator to easily approach the victim.

The above description is only for helping the understanding of the background for the technical ideas of the present disclosure, and therefore it should not be understood as the content corresponding to the prior art known to those skilled in the art.

SUMMARY

Embodiments of the present disclosure provide a device and method for controlling a door lock without a user input.

A door lock control device associated with a door lock, according to one embodiment of the present disclosure, includes: a door lock interface configured to communicate with the door lock; an imaging device; a controller configured to process images obtained through the imaging device; and a storage medium, wherein the controller may be configured to: determine each of a first object and a second object as one of an authorized person and an unauthorized person depending on whether each of the first object and the second object detected from the images matches an authentication data read from the storage medium; control the door lock through a door lock interface with reference to a distance between the first object and the second object determined from the images when it is determined that the first object is the authorized person and the second object is the unauthorized person; and control the door lock to perform a first action when the distance is less than a first threshold value and greater than a second threshold value smaller than the first threshold value, and control the door lock to perform a second action when the distance is less than or equal to the second threshold value.

The first action may include unlocking the door lock.

The second action may include maintaining a lock of the door lock and generating a preset alarm.

The controller may be configured to: determine a moving velocity of the second object in the image; and control the door lock through the door lock interface with further reference to the moving velocity of the second object.

The controller may be configured to: determine a facial expression type of the first object in the image; and control the door lock through the door lock interface with further reference to whether the facial expression type of the first object is a preset facial expression type.

The door lock control device may further include a pressure infrared (PIR) sensor configured to detect a human body adjacent to the door lock control device, wherein the controller may be configured to activate an operation of detecting the first object and the second object and an operation of determining each of the first object and the second object as one of the authorized person and the unauthorized person depending on a result of the human body detection by the PIR sensor.

The controller may be configured to determine a first distance corresponding to the first object, a second distance corresponding to the second object, and a distance between the first object and the second object based on the first distance and the second distance.

The controller may be configured to: generate feature data corresponding to each of the first object and the second object, and determine each of the first object and the second object as one of the authorized person and the unauthorized person depending on whether the feature data corresponding to each of the first object and the second object matches the authentication data.

The door lock control device may further include a communicator, wherein the imaging device may include first and second imaging devices, each of which generates the image, the first imaging device may provide the images to the controller through a bus system, and the second imaging device may provide the images to the controller through the communicator.

According to another aspect of the present disclosure, there is provided a method of controlling a door lock. The method includes acquiring images through an imaging device; detecting a first object and a second object in the images; determining each of the first object and the second object as one of an authorized person and an unauthorized person depending on whether each of the first object and the second object matches preset authentication data; and controlling the door lock by referring to a distance between the first object and the second object determined from the images when it is determined that the first object is the authorized person and the second object is the unauthorized person, wherein the controlling of the door lock may include controlling the door lock to perform a first action when the distance is less than a first threshold value and greater than a second threshold value smaller than the first threshold value and controlling the door lock to perform a second action when the distance is less than or equal to the second threshold value.

The first action may include unlocking the door lock.

The second action may include maintaining a lock of the door lock and generating a preset alarm.

The controlling of the door lock may include controlling the door lock by further referring to a moving velocity of the second object determined from the image.

The controlling of the door lock may include controlling the door lock by further referring to whether a facial expression type of the first object is a preset expression type.

The method may further include detecting a human body adjacent to the door lock using a PIR sensor, and activating the detecting of the first object and the second object depending on a result of the human body detection.

Advantageous Effects

According to embodiments of the present disclosure, a device and method for controlling a door lock without a user input are provided. For example, the door lock control device and an operating method thereof may detect situations in which a user is through images or video data acquired by a door lock system, and control the door lock to perform a specific action depending on the detection result.

DESCRIPTION OF EXEMPLARY EMBODIMENTS

Hereinafter, preferred embodiments according to the present disclosure will be described in detail with reference to the accompanying drawings. It should be noted that in the following description, only parts necessary for understanding the operation according to the present disclosure are described, and descriptions of other parts will be omitted so as not to obscure the gist of the present disclosure. In addition, the present disclosure is not limited to the embodiments described herein and may be embodied in other forms. The embodiments described herein are merely provided to explain in detail enough to easily implement the technical spirit of the present disclosure to those of ordinary skill in the art to which the present disclosure pertains.

Throughout the specification, when a part is "connected" with another part, this includes not only the case of being "directly connected" but also the case of being "indirectly connected" with a third part interposed therebetween. The terminology used herein is for the purpose of describing specific embodiments and not for limiting the present disclosure. Throughout the specification, when a part "includes" a certain element, it means that other elements may be further included, rather than excluding other elements, unless otherwise stated. "At least any one of X, Y, and Z" and "at least any one selected from the group consisting of X, Y, and Z" may be interpreted as any combination of one X, one Y, one Z, or two or more of X, Y, and Z (e.g., XYZ, XYY, YZ, ZZ). Herein, "and/or" includes any combination of one or more of the components.

Figure 1:
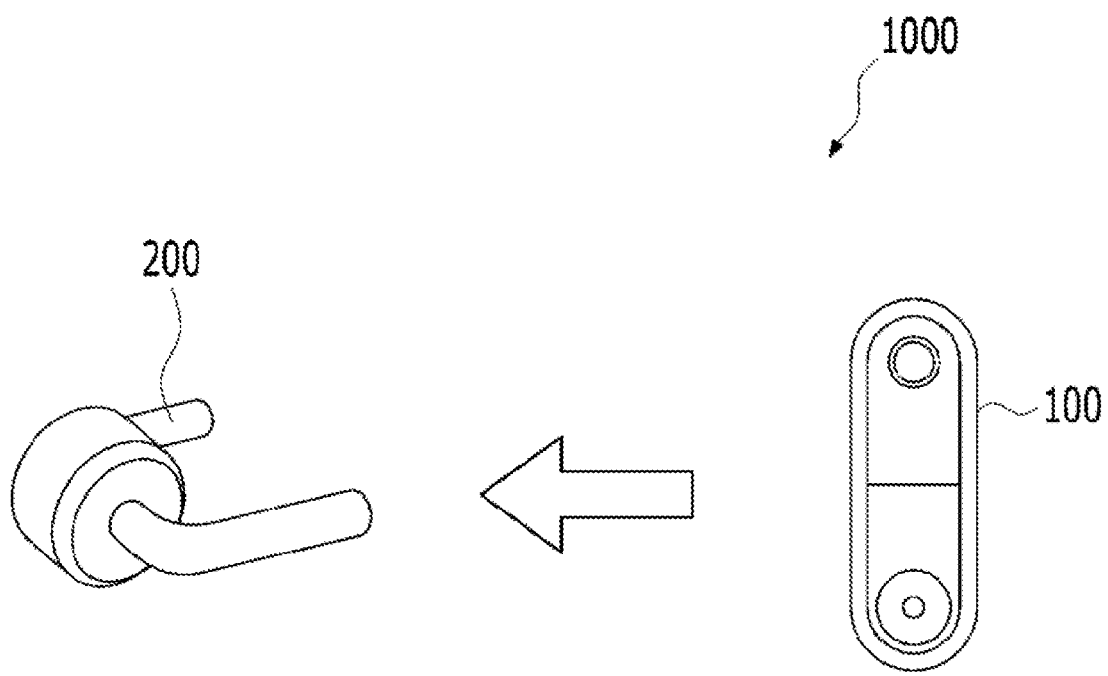
FIG. 1 is a block diagram showing a door lock system according to one embodiment of the present disclosure.

FIG. 1 is a block diagram showing a door lock system according to one embodiment of the present disclosure.

Referring to FIG. 1, the door lock system 1000 may include a door lock control device installed in association with a door lock 200, such as a doorbell 100, and the door lock 200.

The doorbell 100 may be installed adjacent to the door lock 200, and may control the locking and unlocking of the door lock 200 by controlling the door lock 200. In embodiments, the doorbell 100 and the door lock 200 may be provided as one unit. In other embodiments, the doorbell 100 and the door lock 200 are provided as separate units, and the doorbell 100 may communicate with the door lock 200 through wired and/or wireless communication to control the door lock 200.

Figure 2:
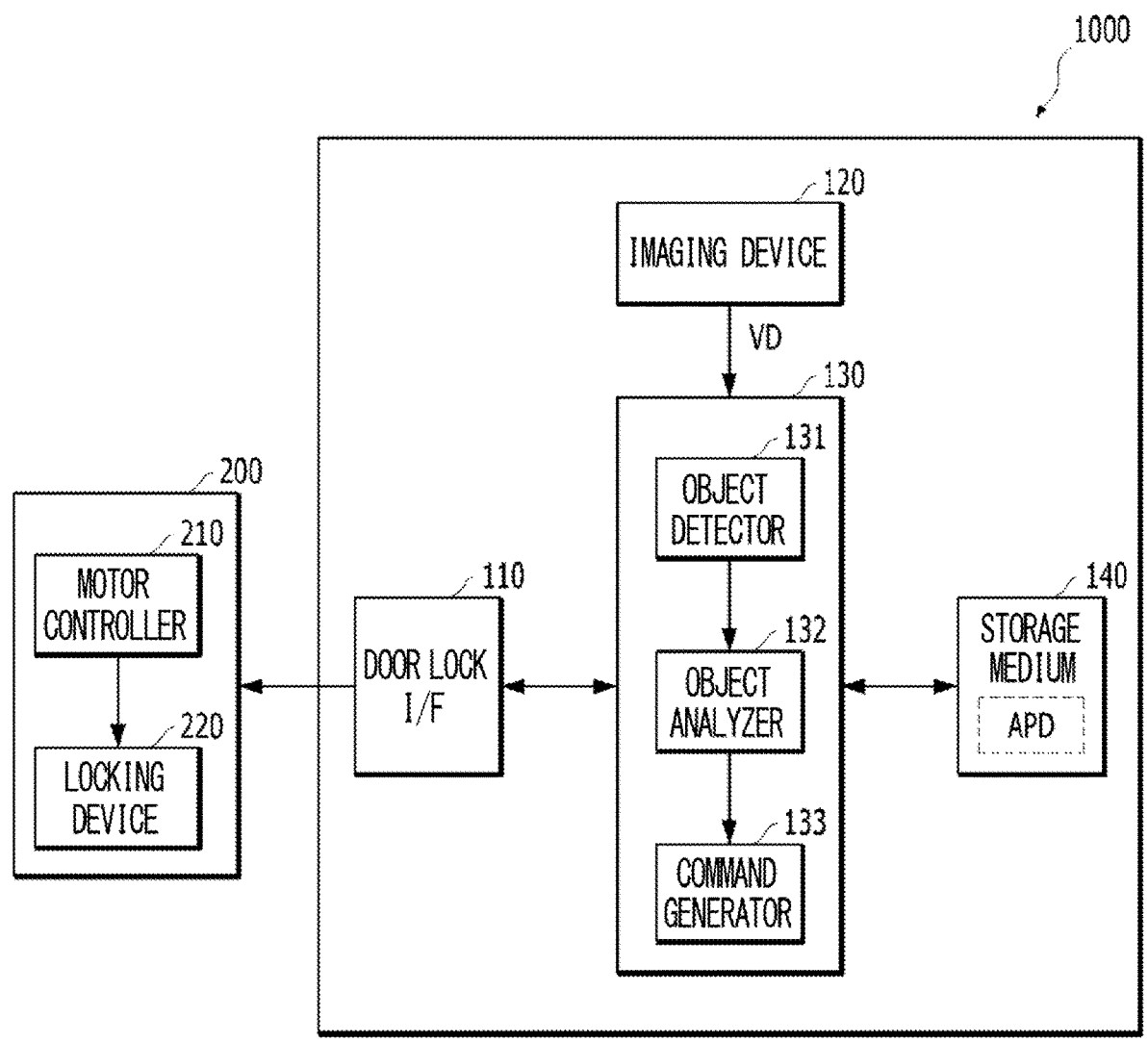
FIG. 2 is a block diagram showing one embodiment of the door lock system of FIG. 1.
Figure 3:
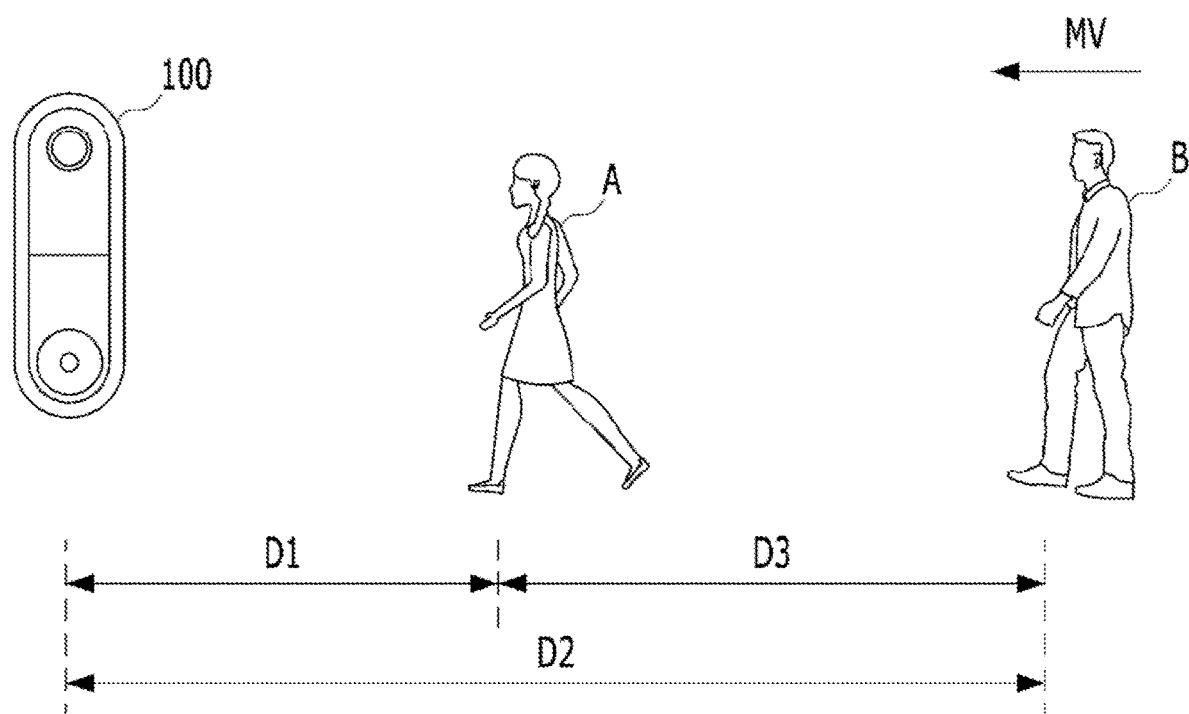
FIG. 3 is a view showing a doorbell and people photographed by it.

FIG. 2 is a block diagram showing one embodiment of the door lock system of FIG. 1. FIG. 3 is a view showing a doorbell and people photographed by it.

Referring to FIG. 2, the door lock system 1000 may include a doorbell 100 and a door lock 200. The doorbell 100 is configured to communicate with the door lock 200 to control the door lock 200. The door lock 200 is configured to lock or unlock a locking device 220 in response to the control of the doorbell 100.

The doorbell 100 may include a door lock interface (I/F) 110, at least one imaging device 120 (The imaging device may acquire a still image and/or a sequence of images, i.e., video. Thus, the imaging device may be referred as a camera, a video camera, or the like.), a door lock controller 130, and a storage medium 140. The door lock interface 110 interfaces between the components of the doorbell 100 and the door lock 200. The door lock interface 110 may transmit a control signal from the door lock controller 130 to the door lock 200, and the door lock 200 may operate in response to the control signal.

The imaging device 120 is configured to generate video data VD by photographing an external subject. In embodiments, the imaging device 120 may include an image sensor configured to generate images by converting light from a subject into an electrical signal, and an image signal processor configured to generate video data VD by processing the images from the image sensor. The imaging device 120 may also capture still images. Accordingly, the imaging device 120 may be referred to as an image capture device or an imaging device.

In FIG. 2, the imaging device 120 is illustrated as a component included in the doorbell 100. However, embodiments of the present disclosure are not limited thereto. For example, the imaging device 120 of FIG. 2 may be provided as a component separated from the doorbell 100, and such an imaging device 120 may communicate with the doorbell 100 and/or the door lock controller 130 through wired and/or wireless communication using a component such as a communicator (see 2800 in FIG. 8). As another example, an imaging device that is located outside the doorbell 100 and provides video data to the doorbell 100 and/or the door lock controller 130 through wired and/or wireless communication may be additionally provided. In this case, the imaging device 120 included in the doorbell 100 of FIG. 2 may communicate with the door lock controller 130 through a bus system in the doorbell 100.

The door lock controller 130 is connected to the door lock interface 110, the imaging device 120, and the storage medium 140. The door lock controller 130 may receive video data VD from the imaging device 120. The door lock controller 130 is configured to control the door lock 200 through the door lock interface 110 with reference to the video data VD. The door lock controller 130 may include an object detector 131, an object analyzer 132, and a command generator 133.

The object detector 131 is configured to detect person objects in the video data VD and determine whether the detected person objects are authorized persons or unauthorized persons. In embodiments, the object detector 131 may detect person objects in the video data VD through at least one of various human detection algorithms known in the art, and track the detected person objects.

The object detector 131 may determine whether the person object detected from the video data VD is an authorized person or an unauthorized person with reference to data indicating authorized persons APD (hereinafter, referred to as authentication data). In embodiments, the authentication data APD may include feature data corresponding to authorized persons. In other embodiments, the authentication data APD may be an image file. The authentication data APD may be stored in the storage medium 140.

The object detector 131 may identify a face of a person object in the video data VD and generate feature data including feature points from the identified face, and when the generated feature data matches the authentication data APD, the object detector 131 may determine the corresponding person object as an authorized person, but when the generated feature data does not match the authentication data APD, the object detector 131 may determine the corresponding person object as an unauthorized person. In addition, the object detector 131 may determine whether the person object matches the authentication data APD based on various methods. In embodiments, the object detector 131 may include at least one of various face recognition algorithms known in the art.

In embodiments, a user of the door lock system 1000 may register authentication data APD in advance. For example, the doorbell 100 may support a registration mode, and in the registration mode, the user may allow the imaging device 120 to photograph his/her face, and the object detector 131 may generate authentication data APD from the photographed face.

In embodiments, the object detector 131 may be configured to detect a facial expression type of a person object. The object detector 131, through various methods and/or algorithms for detecting the facial expression type known in the art, may match the detected face of the person object to any one of a plurality of facial expression types such as happiness, sadness, anger, surprise, fear, disgust, contempt, neutral, and the like.

When a first person object and a second person object are detected by the object detector 131 and it is determined that the first person object is an authorized person and the second person object is an unauthorized person, the object analyzer 132 determines a distance between the first and second person objects from the video data VD. The object analyzer 132 may determine a distance between the first and second person objects from the video data VD through at least one of various methods known in the art. Referring to FIG. 3, the object analyzer 132 may determine a first distance D1 between the doorbell 100 and a first person A corresponding to the first person object and a second distance D2 between the doorbell 100 and a second person B corresponding to the second person object in each frame of the video data VD, and determine a distance D3 between the first and second person objects based on a difference between the determined first and second distances D1 and D2. In this case, the first distance D1 is shorter than the second distance D2. The distance (e.g., D1 and D2) of each person object may be determined based on various methods. In embodiments, by referring to a size of a person object, an average value of the size of the person object for each distance, and the like in the video data VD, the object analyzer 132 may determine a distance from the doorbell 100 to the corresponding person. To this end, the average value of the size of the person object for each distance may be previously stored in the storage medium 140. In embodiments, the doorbell 100 may include two imaging devices 120 that respectively photograph through two or more binocular lenses, and by referring to a person object and/or location information thereof detected from the video data VD of each of the imaging device 120, the object analyzer 132 may determine a distance from the doorbell 100 to the corresponding person.

In embodiments, the object analyzer 132 may additionally determine a moving velocity MV of the second person B corresponding to the second person object determined to be an unauthorized person. The object analyzer 132 may determine the moving velocity MV of the second person object through analysis of the video data VD. For example, the object analyzer 132 may determine the moving velocity MV of the second person object based on the second distance D2 determined from each frame of the video data VD and a frame rate of the video data VD.

As described above, when an imaging device providing additional video data is further provided outside the doorbell 100, the object analyzer 132 may further refer to the corresponding video data to determine a distance between the first and second person objects with higher reliability and/or accuracy. When the corresponding imaging device performs photographing at a different point from the imaging device 120 of the doorbell 100, for example, at a point higher than the doorbell 100, a distance between the first and second person objects may be measured with higher reliability and/or accuracy.

The object detector 131 may also further refer to the additional video data. In this case, the object detector 131 may detect each person object and determine whether the person object is an authorized person or an unauthorized person with higher reliability. For example, when a person located far away from the doorbell 100 is blocked by a person located close to the doorbell 100 in a viewing angle of the doorbell 100, the object sensor 131 may detect the person located far away based on the additional video data and determine whether the person is an authorized person or an unauthorized person.

Referring back to FIG. 2, the command generator 133 is configured to control the door lock 200 through the door lock interface 110 with reference to the distance between the first and second person objects.

When an unauthorized person approaches the doorbell 100 while following an authorized person, there is a high possibility that the authorized person is exposed to a danger such as crime. As described above, when the first and second person objects are detected from the video data VD and it is determined that the first person object is an authorized person and the second person object is an unauthorized person, the doorbell 100 controls the door lock 200 by referring to the distance between the first and second person objects. For example, the doorbell 100 may unlock the door lock 200. Accordingly, the doorbell 100 controls the door lock 200 without a user input when the authorized person is in a situation in which the authorized person is exposed to a danger such as crime, so that the time for the authorized person to input the password into the door lock 200 is eliminated, and accordingly the authorized person can avoid the danger.

In embodiments, the command generator 133 may control the door lock 200 to perform a first action when the distance between the first and second person objects is smaller than a first threshold and greater than a second threshold. The second threshold value is less than the first threshold value. The first action may be unlocking of the door lock 200. The door lock 200 will be locked again after being unlocked. Accordingly, the authorized person may quickly pass through the door, and the possibility that the unauthorized person will follow the authorized person through the door may be reduced.

If the door lock 200 is opened even when the unauthorized person is very close to the authorized person, the unauthorized person may pass through the door by following the authorized person, which may have the authorized person put in a further dangerous situation. The command generator 133 may control the door lock 200 to perform a second action different from the first action when the distance between the first and second person objects is less than or equal to the second threshold value. Accordingly, the door lock 200 may be adaptively controlled depending on various factors such as a user's tendency, a installation location of the door lock 200 and/or the doorbell 100. The second action may be set and/or changed in various ways according to embodiments. The second action may include maintaining the lock of the door lock 200 and generating a preset alarm. For example, the alarm may include a voice message such as "Who is it?", "I'll go out", and the like. Accordingly, it is possible to induce the unauthorized person to no longer approach the authorized person.

The command generator 133 may control the door lock 200 by further referring to the moving velocity MV (see FIG. 3) of the second person object determined as an unauthorized person. Whether or not the authorized person is in a dangerous situation may be more effectively determined based on the moving velocity MV. For example, a relatively high moving velocity MV may mean that the authorized person is more likely to be in a dangerous situation. The command generator 133 may further refer to whether the moving velocity MV of the second person object is faster than a threshold velocity for controlling the door lock 200.

The door lock 200 operates in response to the control of the doorbell 100. The door lock 200 may include a motor controller 210 and a locking device 220. The motor controller 210 may be mechanically and/or electrically coupled to the locking device 220. The motor controller 210 is configured to control locking and unlocking of the locking device 220 according to a control signal from the doorbell 100.

Figure 4:
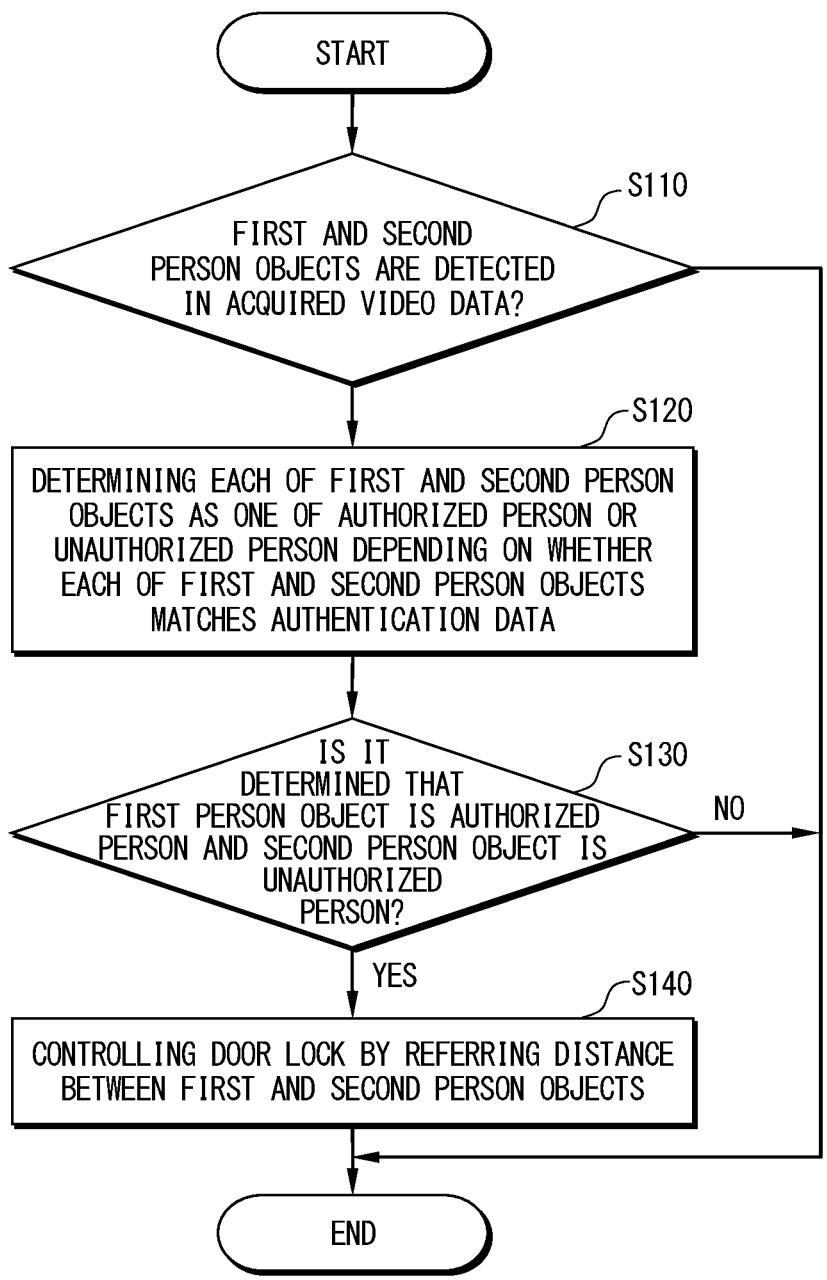
FIG. 4 is a flowchart showing a method of controlling a door lock according to one embodiment of the present disclosure.

FIG. 4 is a flowchart showing a method of controlling the door lock according to one embodiment of the present disclosure.

Referring to FIGS. 1 and 4, in step S110, the doorbell 100 performs step S120 depending on whether a first person object and a second person object are detected in acquired video data. Hereinafter, it is assumed that the distance to the first person object is shorter than the distance to the second person object. The doorbell 100 may detect a person object in acquired video data and track the detected person object in acquired video data through at least one of various human recognition algorithms known in the art.

In step S120, the doorbell 100 determines each of the first and second person objects as one of an authorized person or an unauthorized person depending on whether each of the first and second person objects matches the authentication data.

In step S130, the doorbell 100 performs step S140 when it is determined that the first person object is the authorized person and the second person object is the unauthorized person.

In step S140, the doorbell 100 controls the door lock with reference to the distance between the first and second person objects determined from the video data.

Figure 5:
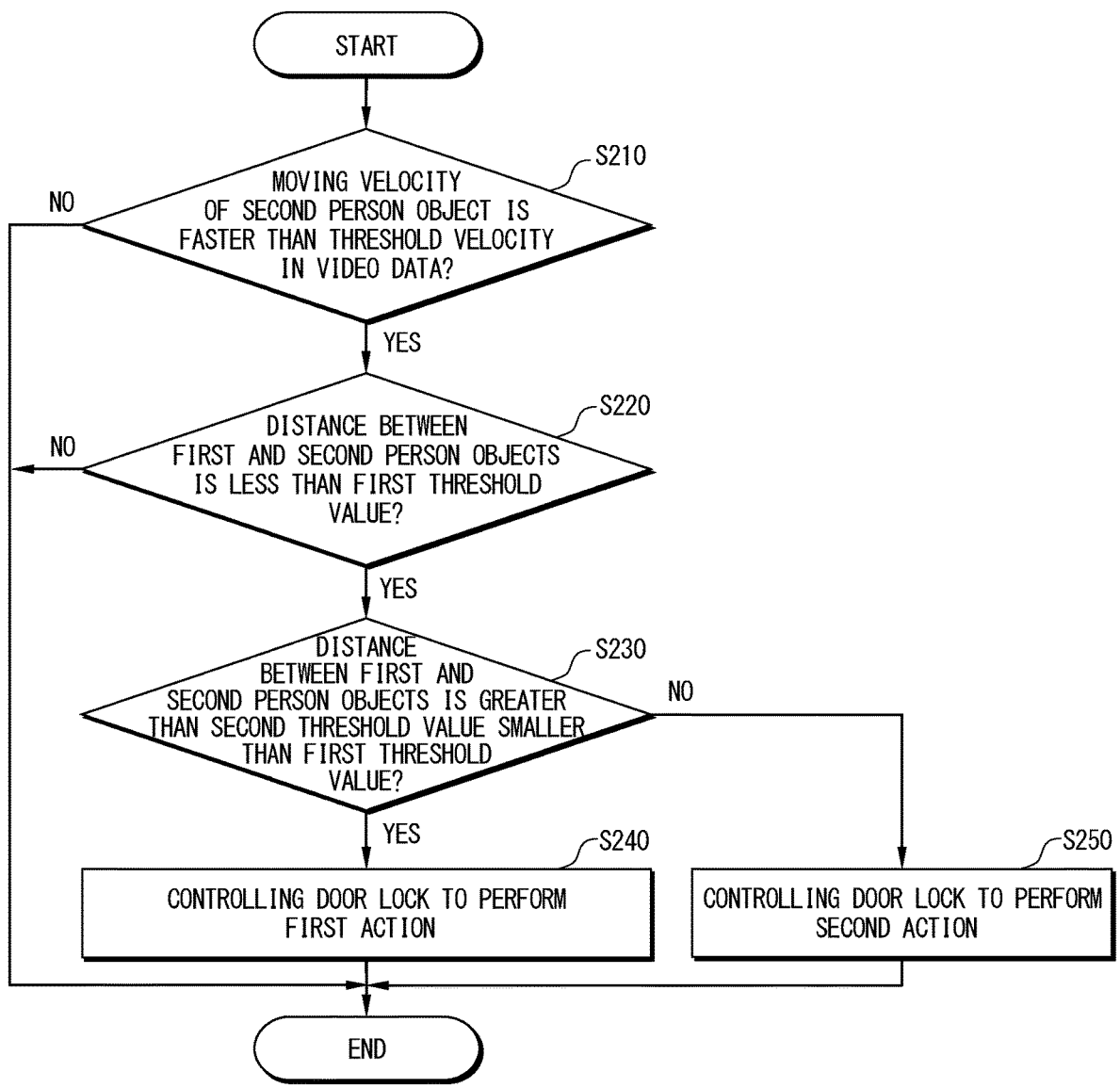
FIG. 5 is a flowchart showing one embodiment of step S140 in FIG. 4.

FIG. 5 is a flowchart showing one embodiment of step S140 in FIG. 4.

Referring to FIGS. 1 and 5, in step S210, the doorbell 100 determines whether the moving velocity of the second person object is faster than the threshold velocity in the video data. If so, step S220 is performed. The moving velocity greater than the threshold velocity may mean that the authorized person is more likely to be exposed to danger. In this way, the moving velocity of the second person object, which is an unauthorized person, may be referred to determine whether the first person object, which is an authorized person, is in a dangerous situation.

In step S220, the doorbell 100 determines whether the distance between the first and second person objects is less than a first threshold value. The doorbell 100 may determine a first distance to the first person object and a second distance to the second person object in each frame of the video data, and determine a distance between the first and second person objects based on a difference between the determined first and second distances. In this case, the first distance is shorter than the second distance. The distance between the first and second person objects less than the first threshold value may mean that an authorized person corresponding to the first person object is likely to be exposed to danger. If the distance between the first and second person objects is less than the first threshold value, step S230 is performed.

In step S230, the doorbell 100 determines whether the distance between the first and second person objects is greater than a second threshold value. If so, step S240 is performed. If not, step S250 is performed. The second threshold value is less than the first threshold value.

In step S240, the doorbell 100 controls the door lock 200 to perform a first action. The first action may be unlocking of the door lock 200. The door lock 200 will be locked again after being unlocked. Accordingly, an authorized person corresponding to the first person object may quickly pass through the door, and it is difficult for an unauthorized person corresponding to the second person object to pass through the door following the authorized person.

In the case that the unauthorized person is very close to the authorized person, if the door lock 200 is opened, the unauthorized person may follow the authorized person through the door, which may have the authorized person put in a further dangerous situation. In step S250, the doorbell 100 controls the door lock 200 to perform a second action. The second action may include maintaining the lock of the door lock 200 and generating a preset alarm. For example, the alarm may include a voice message such as "Who is it?", "I'll go out", and the like. Accordingly, it is possible to induce an unauthorized person corresponding to the second person object to no longer approach the authorized person corresponding to the first person object.

Figure 6:
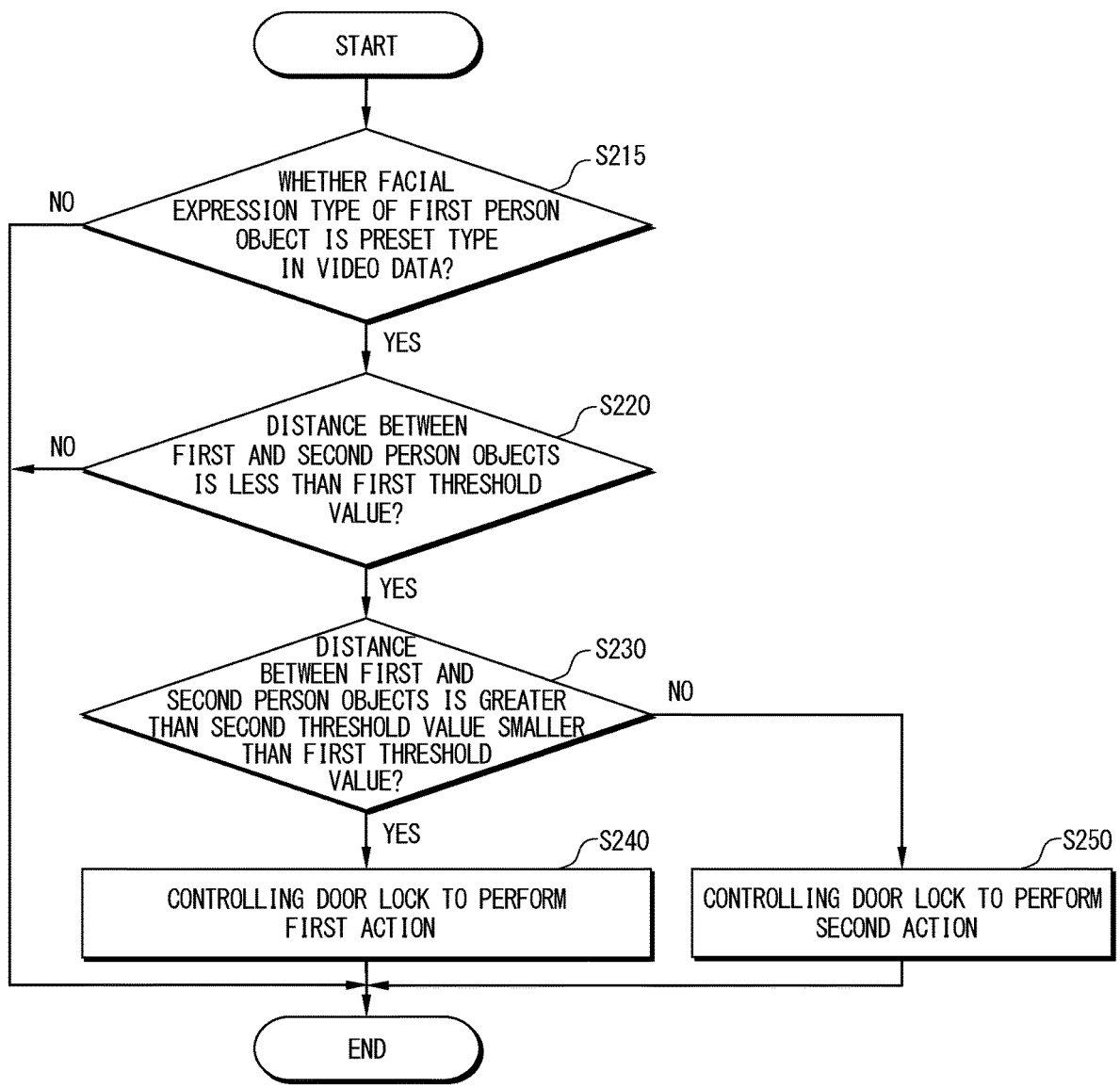
FIG. 6 is a flowchart illustrating another embodiment of step S140 in FIG. 4.

FIG. 6 is a flowchart illustrating another embodiment of step S140 in FIG. 4.

Referring to FIGS. 1 and 6, in step S215, the doorbell 100 determines whether the facial expression type of the first person object is a preset type in the acquired video data. For example, the doorbell 100 may detect the facial expression type of the first person object and determine whether the determined facial expression type is any one of preset types, for example, surprise, fear, disgust, and contempt. If the facial expression type of the first person object is any one of the above-defined types, it may mean that the first person object, which is an authorized person, is highly likely to be exposed to danger. In this way, when the facial expression type of the first person object is the preset type, step S220 may be performed. In embodiments, step S215 may be performed by the object detector 131 in FIG. 2.

Steps S220 to S250 are described in the same manner as steps S220 to S250 described with reference to FIG. 5. Hereinafter, redundant descriptions are omitted.

Figure 7:
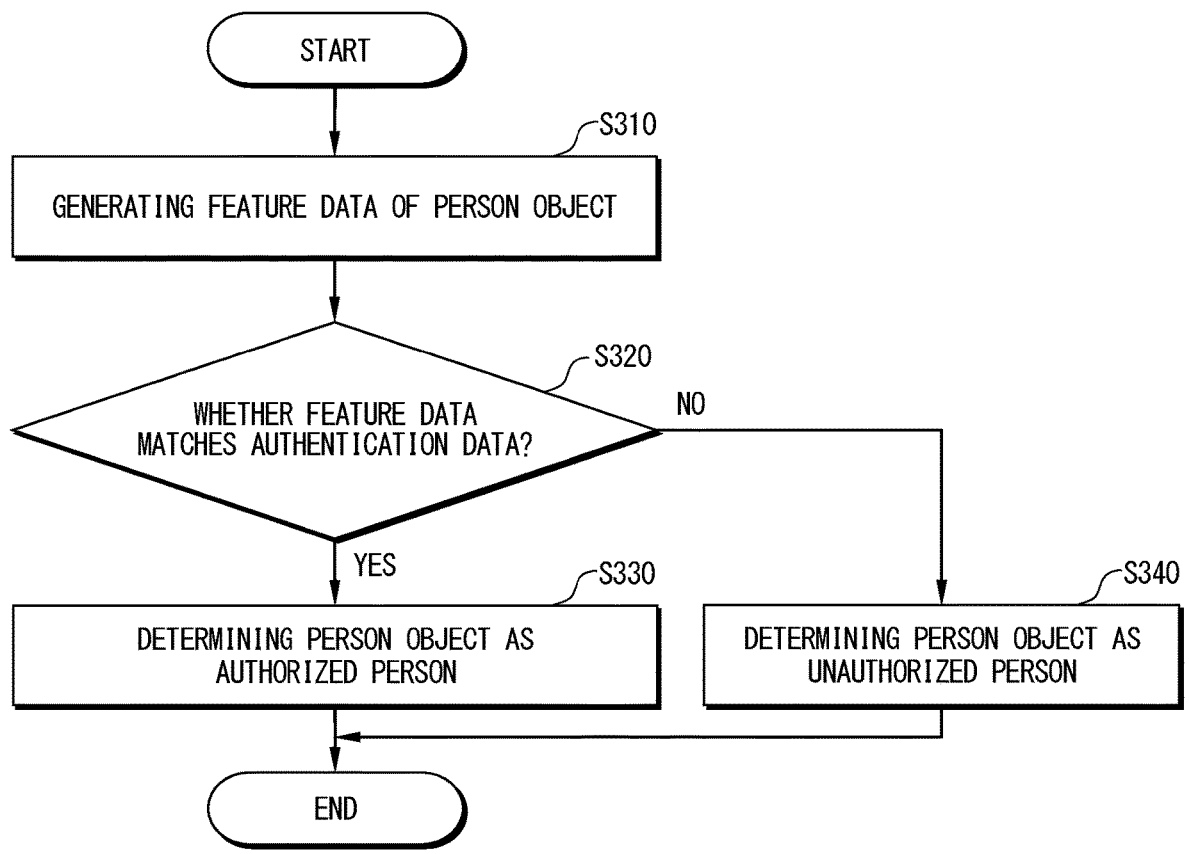
FIG. 7 is a flowchart showing one embodiment of step S120 in FIG. 4.

FIG. 7 is a flowchart showing one embodiment of step S120 in FIG. 4.

Referring to FIGS. 1 and 7, in step S310, the doorbell 100 may generate feature data of a person object from the acquired video data. In embodiments, the doorbell 100 may include at least one of various face detection algorithms known in the art.

In step S320, the doorbell 100 determines whether the feature data matches the authentication data. If so, step S330 is performed. If not, step S340 is performed.

In embodiments, the doorbell 100 may support a registration mode to allow a user to register authentication data. The doorbell 100 photographs the user's face in the registration mode, and may generate feature data including feature points from the photographed face. The generated feature data may be stored in an internal storage medium as authentication data.

In step S330, the doorbell 100 may determine the person object as an authorized person. In step S340, the doorbell 100 may determine the person object as an unauthorized person. The doorbell 100 may perform steps S310 to S340 while tracking the detected person object whenever a person object is detected in acquired video data.

Figure 8:
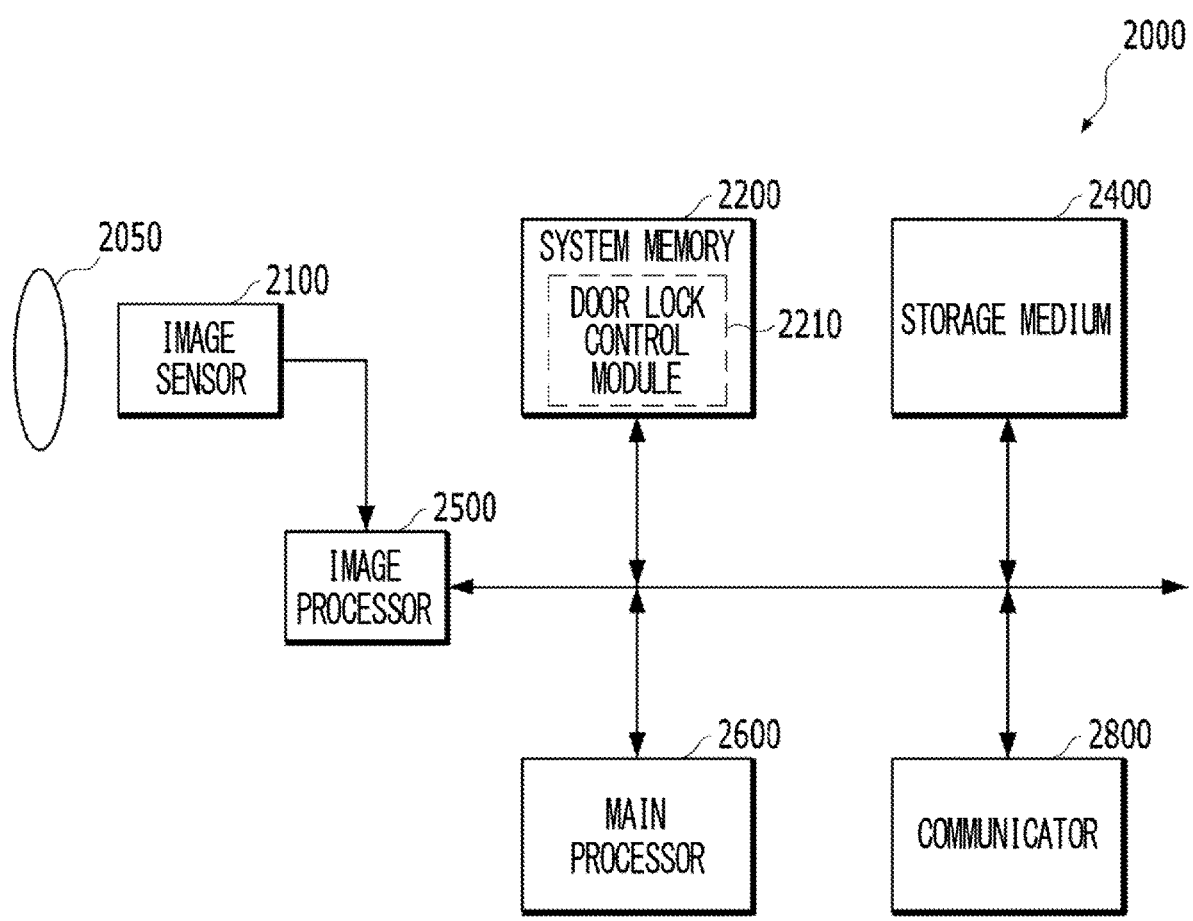
FIG. 8 is a block diagram showing one embodiment of the doorbell in FIG. 2.

FIG. 8 is a block diagram showing one embodiment of the doorbell in FIG. 2.

Referring to FIG. 8, the doorbell 2000 may include an optical system 2050, an image sensor 2100, a system memory 2200, a storage medium 2400, an image processor 2500, a main processor 2600, and a communicator 2800.

The optical system 2050 receives light from a subject. The image sensor 2100 is configured to convert an optical signal received through a component such as a lens of the optical system 2050 into an electrical signal, and digitize the converted electrical signal to generate an image. For example, the image sensor 2100 may include an analog-to-digital converter configured to convert an analog image signal into digital image data.

The system memory 2200 is connected to the image processor 2500 and the main processor 2600. The system memory 2200 may be used as a working memory of the image processor 2500 and the main processor 2600. In embodiments, the system memory 2200 may include a random access memory (RAM). Further, the system memory 2200 may temporarily store data processed by the image processor 2500 and the main processor 2600. In FIG. 8, the system memory 2200 is illustrated as being separate from the main processor 2600, but at least a portion of the system memory 2200 may be included in the main processor 2600. The system memory 2200 may be provided as two or more separate components.

The storage medium 2400 may include a nonvolatile storage medium such as a flash memory. The storage medium 2400 may be provided as the storage medium 140 in FIG. 2. In embodiments, the storage medium 2400 may further store program codes and/or instructions to be executed by the image processor 2500 and the main processor 2600. In embodiments, the storage medium 2400 may store set data required for operations of the image processor 2500 and the main processor 2600.

The image processor 2500 is configured to process images received from the image sensor 2100. For example, the image processor 2500 may perform appropriate processing on the images received from the image sensor 2100, such as storing the images from the image sensor 2100 in the system memory 2200, converting image data in red (R), green (G), and blue (B) format to image data in luminance (Y) and chrominance (Cb, Cr) format, and converting the resolution of image data, and the like. The processed images may be stored in the system memory 2200. In embodiments, the image sensor 2100 and the image processor 2500 may constitute at least a part of the imaging device 120 in FIG. 2.

The main processor 2600 controls overall operations of the doorbell 2000. The main processor 2600 may control the optical system 2050, the image sensor 2100, and the image processor 2500 to perform operations associated with capturing images or acquiring video data.

The main processor 2600 may load program codes and/or instructions from the storage medium 2400 into the system memory 2200 and execute the loaded program codes and/or instructions. When executed by the main processor 2600, the main processor 2600 may load a door lock control module 2210 providing functions of the door lock controller 130 in FIG. 2 into the system memory 2200. Such program codes and/or instructions may be executed by the main processor 2600 to perform operations of the door lock controller 130 described with reference to FIG. 2.

The communicator 2800 may provide communication between the doorbell 2000 and an external device in response to the control of the main processor 2600. When the doorbell 2000 is separated from the door lock 200 (see FIG. 2), the communicator 2800 may be provided as the door lock interface 110 in FIG. 2. In this case, the communicator 2800 may communicate with the door lock 200 in a wired and/or wireless manner.

Figure 9:
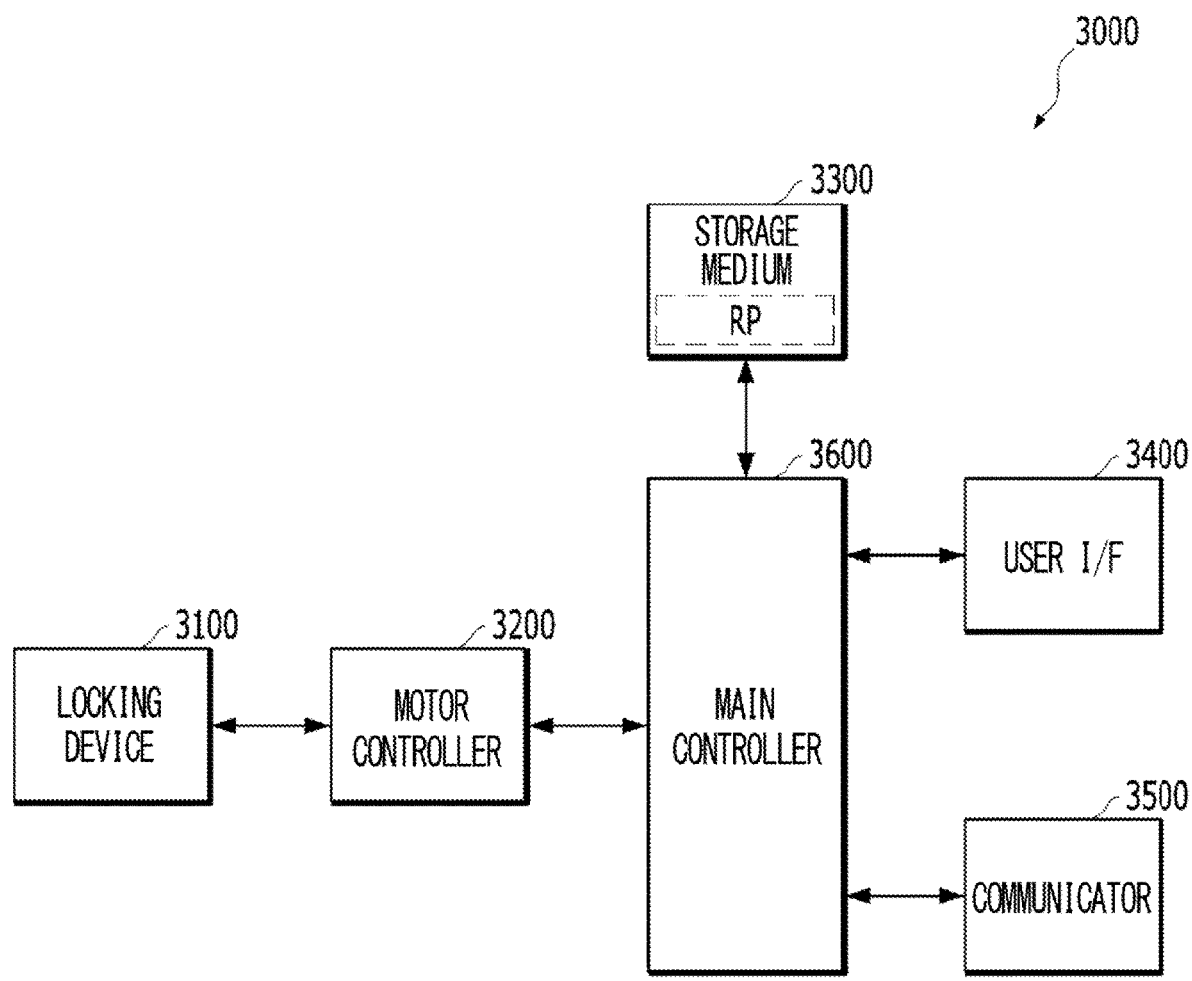
FIG. 9 is a block diagram showing one embodiment of the door lock in FIG. 2.

FIG. 9 is a block diagram showing one embodiment of the door lock in FIG. 2.

Referring to FIG. 9, the door lock 3000 may include a locking device 3100, a motor controller 3200, a storage medium 3300, a user interface 3400, a communicator 3500, and a main controller 3600.

The motor controller 3200 is connected to the main controller 3600. The motor controller 3200 is configured to control locking and unlocking of the locking device 3100 in response to a control signal from the main controller 3600. The locking device 3100 and the motor controller 3200 may be provided as the locking device 220 and the motor controller 210 in FIG. 2.

The storage medium 3300 may be a nonvolatile storage medium. The storage medium 3300 is configured to store the password RP registered by the user. The password RP may be encrypted and stored. In embodiments, the password RP may be received through the user interface 3400 and may be written to the storage medium 3300 by the main controller 3600.

The user interface 3400 receives a user input for controlling operations of the door lock 3000 or the main controller 3600. In embodiments, the user interface 3400 may include a keypad, a touch pad, and the like for receiving a password from a user.

The communicator 3500 may communicate with the doorbell 100 (see FIG. 2) in response to the control of the main controller 3600. When the door lock 3000 is separated from the doorbell 100, the communicator 3500 may communicate with the doorbell 100 or the door lock interface 110 (see FIG. 2) of the doorbell 100 in a wired and/or wireless manner.

The main controller 3600 controls overall operations of the door lock 300. The main controller 3600 may determine whether the user input received through the user interface 3400 matches the password RP, and may control the motor controller 3200 depending on the determination result to control lock and unlock of the locking device 3100. According to an embodiment of the present disclosure, the door lock 3000 may operate under the control of the doorbell 100. For example, the main controller 3600 may unlock the locking device 3100 by controlling the motor controller 3200 in response to a control signal received from the doorbell 100. Alternatively, the main controller 3600 may control a speaker thereof in response to a control signal received from the doorbell 100 to generate an alarm.

Figure 10:
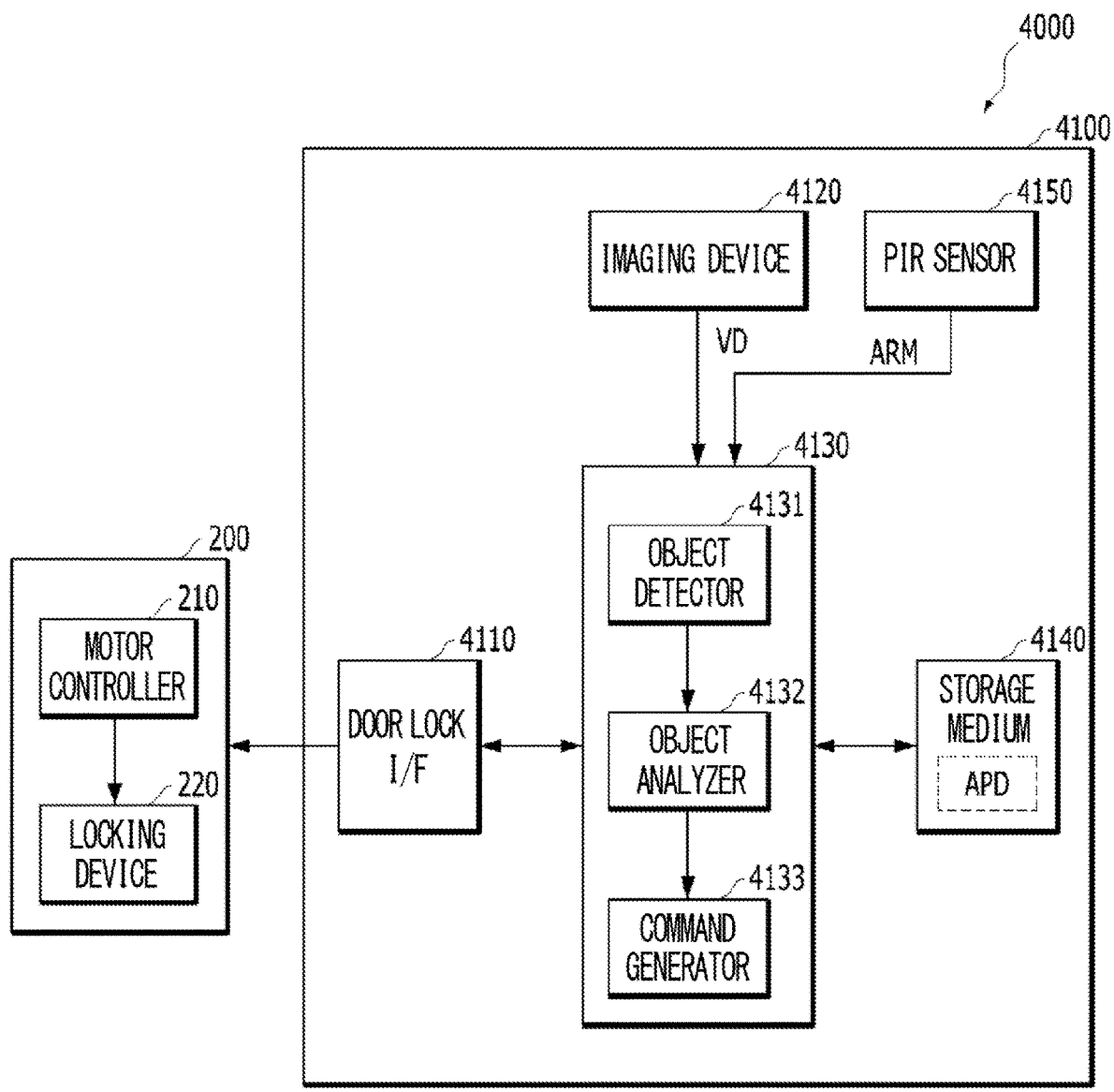
FIG. 10 is a block diagram showing another embodiment of the door lock system in FIG. 1.

FIG. 10 is a block diagram showing another embodiment of the door lock system in FIG. 1.

Referring to FIG. 10, the door lock system 4000 may include a doorbell 4100 and a door lock 200. The doorbell 4100 may include a door lock interface 4110, at least one imaging device 4120, a door lock controller 4130, a storage medium 4140 and a passive infrared (PIR) sensor 4150. The doorbell 4100 is configured in the same manner as the doorbell 100 described with reference to FIG. 2 except for the PIR sensor 410. The door lock 200 is configured in the same manner as the door lock 200 described with reference to FIG. 2. Hereinafter, redundant descriptions are omitted.

The PIR sensor 4150 is configured to detect movement of a human body within a preset coverage around the doorbell 4100 and/or the door lock system 4000 through various methods well known in the art. For example, the PIR sensor 4150 may detect an infrared signal emitted from an object such as a human body and process the detected infrared signal to detect movement of the human body. In embodiments, the PIR sensor 4150 may detect one or more human bodies. The PIR sensor 4150 may generate an alarm signal ALM in response to detection of a human body.

The door lock controller 4130 and/or an object detector 4131 may activate and/or initiate their operations described herein in response to the alarm signal ALM. For example, the object detector 4131 may detect person objects in video data VD in response to the alarm signal ALM and determine whether the detected person objects are authorized persons or unauthorized persons. For example, the object detector 4131 may determine whether the face of the person object is a preset facial expression type in response to the alarm signal ALM, and may perform subsequent operations. Therefore, power consumed by the door lock controller 4130 may be reduced. Accordingly, for example, when the doorbell 4100 is driven by a limited power source such as a battery, the operation time of the doorbell 4100 may increase.

Although specific embodiments and application examples have been described herein, the present disclosure is provided to help a more general understanding of the present disclosure, and the present disclosure is not limited to the above embodiments, and various modifications and changes may be made to this description by those of ordinary skill in the art to which the present disclosure pertains.

Therefore, the spirit of the present disclosure should not be limited to the described embodiments, and it is said that not only the claims to be described later but also all those with equivalent or equivalent modifications to the claims belong to the scope of the present disclosure.

What is claimed is:

1. A door lock control device associated with a door lock, the device comprising:
   a door lock interface configured to communicate with the door lock;
   an imaging device;
   a controller configured to process images acquired through the imaging device; and
   a storage medium,
   wherein the controller is configured to:
   determine each of a first object and a second object as one of an authorized person and an unauthorized person depending on whether each of the first object and the second object detected from the images matches authentication data read from the storage medium; and
   control the door lock through a door lock interface with reference to a distance between the first object and the second object determined from the images when it is determined that the first object is the authorized person and the second object is the unauthorized person; and
   control the door lock to perform a first action when the distance is smaller than a first threshold value and is greater than a second threshold value, and control the door lock to perform a second action when the distance is less than or equal to the second threshold value.

2. The door lock control device of claim 1, wherein the first action includes unlocking the door lock.

3. The door lock control device of claim 1, wherein the second action includes maintaining a lock of the door lock and generating a preset alarm.

4. The door lock control device of claim 1, wherein the controller is configured to:
   determine a moving velocity of the second object in the images; and
   control the door lock through the door lock interface by further referring to the moving velocity of the second object.

5. The door lock control device of claim 1, wherein the controller is configured to: determines a facial expression type of the first object in the images; and
   control the door lock through the door lock interface by further referring to whether the facial expression type of the first object is a preset facial expression type.

6. The door lock control device of claim 1, further comprising:
   a pressure infrared sensor (PIR) configured to detect a human body adjacent to the door lock control device is further included,
   wherein the controller is configured to activate an operation of detecting the first object and the second object and an operation of determining each of the first object and the second object as one of the authorized person and the unauthorized person depending on a result of the human body detection by the PIR sensor.

7. The door lock control device of claim 1, wherein the controller is configured to determine a first distance corresponding to the first object, a second distance corresponding to the second object, and a distance between the first object and the second object based on the first distance and the second distance.

8. The door lock control device of claim 1, wherein the controller is configured to:
- generate feature data corresponding to each of the first object and the second object; and
- determine each of the first object and the second object as one of the authorized person and the unauthorized person depending on whether the feature data corresponding to each of the first object and the second object matches the authentication data.

9. The door lock control device of claim 1, further comprising a communicator,
- wherein the imaging device includes a first imaging device and a second imaging device, each of which generates the images,
- the first imaging device provides the images to the controller through a bus system, and
- the second imaging device provides the images to the controller through the communicator.

10. A method of controlling a door lock, comprising:
- acquiring images through an imaging device;
- detecting a first object and a second object in the images;
- determining each of the first object and the second object as one of an authorized person and an unauthorized person depending on whether each of the first object and the second object matches preset authentication data; and
- controlling the door lock by referring to a distance between the first object and the second object determined from the images when it is determined that the first object is the authorized person and the second object is the unauthorized person,
- wherein the controlling of the door lock, comprises:
- controlling the door lock to perform a first action when the distance is less than a first threshold value and greater than a second threshold value less than the first threshold value; and
- controlling the door lock to perform a second action when the distance is less than or equal to the second threshold value.

11. The method of claim 10, wherein the first action includes unlocking the door lock.

12. The method of claim 10, wherein the second action includes maintaining a lock of the door lock and generating a preset alarm.

13. The method of claim 10, wherein the controlling of the door lock comprises controlling the door lock by further referring to a moving velocity of the second object determined from the images.

14. The method of claim 10, wherein the controlling of the door lock comprises controlling the door lock by further referring to whether a facial expression type of the first object is a preset facial expression type.

15. The method of claim 10, further comprising:
- detecting a human body adjacent to the door lock using a PIR sensor; and
- activating the detecting of the first object and the second object depending on a result of the human body detection.

* * * * *